(12) United States Patent
Ng

(10) Patent No.: US 9,120,451 B2
(45) Date of Patent: Sep. 1, 2015

(54) ANTI-THEFT DEVICE

(76) Inventor: Chee Wah Ng, Kuala Lumpur (MY)

( * ) Notice: Subject to any disclaimer, the term of this patent is extended or adjusted under 35 U.S.C. 154(b) by 0 days.

(21) Appl. No.: 13/884,895

(22) PCT Filed: Aug. 27, 2012

(86) PCT No.: PCT/MY2012/000239
§ 371 (c)(1),
(2), (4) Date: May 15, 2013

(87) PCT Pub. No.: WO2014/014335
PCT Pub. Date: Jan. 23, 2014

(65) Prior Publication Data
US 2015/0121976 A1    May 7, 2015

(30) Foreign Application Priority Data
Jul. 17, 2012 (MY) .............................. PI2012003251

(51) Int. Cl.
*B60R 25/00* (2013.01)
*B60R 25/08* (2006.01)
(52) U.S. Cl.
CPC ............. *B60R 25/083* (2013.01); *B60R 25/005* (2013.01)
(58) Field of Classification Search
CPC .. B60R 25/005; B60R 25/006; B60R 25/007; B60R 25/008; B60R 25/0221; B60R 25/083; B60R 25/086; B60R 25/063; B60R 25/08; B60R 25/066; G05G 5/00; G05G 5/005; G05G 5/02; G05G 5/04; G05G 5/06; G05G 5/08; G05G 5/20; G05G 5/24
USPC ........... 70/199, 202, 209, 237, 238, 192–198, 70/200, 201, 203, 206, 254
See application file for complete search history.

(56) References Cited

U.S. PATENT DOCUMENTS

| | | | | |
|---|---|---|---|---|
| 1,733,245 | A * | 10/1929 | Snelling | 40/625 |
| 1,965,939 | A * | 7/1934 | Jacobi | 70/81 |
| 2,050,696 | A * | 8/1936 | Schoorel | 70/95 |
| 2,144,837 | A * | 1/1939 | Douglas | 70/19 |
| 3,245,239 | A * | 4/1966 | Zaidener | 70/202 |
| 3,345,838 | A * | 10/1967 | Russell et al. | 70/100 |
| 3,919,866 | A * | 11/1975 | Lipschutz | 70/81 |
| 4,751,832 | A * | 6/1988 | Carballo | 70/242 |
| 4,825,671 | A * | 5/1989 | Wu | 70/238 |
| 5,138,853 | A * | 8/1992 | Chen | 70/209 |

(Continued)

FOREIGN PATENT DOCUMENTS

AU     200245826 B2    9/2005
GB     2 324 285 A     10/1998

(Continued)

*Primary Examiner* — Lloyd Gall
(74) *Attorney, Agent, or Firm* — Knobbe, Martens Olson & Bear, LLP

(57) ABSTRACT

An anti-theft device for a motor vehicle includes a pedal engaging member (105), a first locking mechanism (215) and a second locking mechanism (210). The pedal engaging member (105) is movable between a first position and a second position, the first position for engaging a pedal of the motor vehicle and the second position for enabling the pedal to move freely. The first locking mechanism (215) is operatively connected to the pedal engaging member (105), for locking the pedal engaging member (105) at the first position. The second locking mechanism (210) is operatively connected to the pedal engaging member (105), for locking the pedal engaging member (105) at the second position.

13 Claims, 7 Drawing Sheets

(56) References Cited

U.S. PATENT DOCUMENTS

| | | | |
|---|---|---|---|
| 5,157,951 A * | 10/1992 | Chen et al. | 70/209 |
| 5,361,613 A * | 11/1994 | Fort et al. | 70/247 |
| 5,704,233 A * | 1/1998 | Farshad | 70/238 |
| 5,906,121 A * | 5/1999 | Mankarious | 70/199 |
| 5,979,197 A * | 11/1999 | Mellini et al. | 70/199 |
| 6,098,434 A * | 8/2000 | Liou | 70/360 |
| 6,202,456 B1 * | 3/2001 | Vickers | 70/202 |
| 6,439,005 B1 * | 8/2002 | Thompson | 70/18 |
| 6,439,013 B1 * | 8/2002 | Chen | 70/202 |
| 6,463,774 B2 * | 10/2002 | Sokurenko | 70/360 |
| 6,575,002 B1 * | 6/2003 | Hsu | 70/202 |
| 6,662,894 B2 * | 12/2003 | Chantrasuwan et al. | 180/287 |
| 7,412,859 B2 * | 8/2008 | Lycoudis | 70/202 |
| 2002/0166356 A1 * | 11/2002 | Kuo | 70/361 |
| 2003/0101780 A1 * | 6/2003 | Simon et al. | 70/202 |
| 2004/0163432 A1 | 8/2004 | Atthaprasith | |

FOREIGN PATENT DOCUMENTS

| | | |
|---|---|---|
| WO | WO 02/102630 A1 | 12/2002 |
| WO | WO 2012/050430 A1 | 4/2012 |

* cited by examiner

ANTI-THEFT DEVICE

FIELD OF THE INVENTION

The present invention relates to anti-theft devices. In particular, although not exclusively, the invention relates to an anti-theft device including a safety lock.

BACKGROUND TO THE INVENTION

Aftermarket anti-theft systems exist for motor vehicles that lock a pedal in place in order to prevent operation of the motor vehicle. Certain locks are completely removable, however more convenient locks exist that are permanently attached to the motor vehicle.

A problem with locks of the prior art that are permanently attached to the motor vehicle is that they are either prone to unintentionally engaging, or are difficult to engage when securing the vehicle.

Unintentionally engaging a pedal lock can have dire consequences when a motor vehicle is underway as the lock can restrict operation of a brake pedal of the vehicle. Similarly, in an accident a lever or handle can swing or project towards a driver of the motor vehicle and injure the driver.

In contrast, anti-theft systems that are not susceptible to accidental engagement, while potentially being safer during operation of the motor vehicle, are not used as often as they are often inconvenient to engage. Accordingly, such anti-theft systems of the prior art provide a lower level of anti-theft protection than other anti-theft systems.

OBJECT OF THE INVENTION

It is an object of some embodiments of the present invention to provide consumers with improvements and advantages over the above described prior art, and/or overcome and alleviate one or more of the above described disadvantages of the prior art, and/or provide a useful commercial choice.

SUMMARY OF THE INVENTION

According to a first aspect, the invention resides in an anti-theft device for a motor vehicle, the anti-theft device including:

a pedal engaging member, movable between a first position and a second position, the first position for engaging a pedal of the motor vehicle and the second position for enabling the pedal to move freely;

a first locking mechanism operatively connected to the pedal engaging member, for locking the pedal engaging member at the first position; and a second locking mechanism operatively connected to the pedal engaging member, for locking the pedal engaging member at the second position.

Preferably, the anti-theft device further comprises a mounting member operatively connected to the pedal engaging member, for attaching the anti-theft device to the motor vehicle. More preferably, the mounting member comprises a pedestal for attaching to a firewall of the motor vehicle. Alternatively, the mounting member comprises a steering column clamp for attaching to a steering column of the motor vehicle.

Preferably, the anti-theft device comprises an inner shaft and an outer shaft, wherein the inner shaft is connected to the pedal engaging member and the outer shaft is attached to the mounting member.

Preferably, the pedal engaging member is movable between the first and second positions by sliding the inner shaft within the outer shaft. Alternatively, the pedal engaging member is movable between the first and second positions by rotating the inner shaft within the outer shaft.

Preferably, the second locking mechanism automatically engages when the pedal engaging member is in the second position.

Preferably, the second locking mechanism comprises a button lock, wherein pressing a button of the button lock releases the second locking mechanism.

Preferably, the second locking mechanism includes a locking pin, for engaging an opening in the inner shaft and preventing movement of the inner shaft relative to the outer shaft.

Preferably, the second locking mechanism includes a wedge member movable in a first direction, the wedge member comprising a sloped surface relative to the first direction for engaging with a locking pin and forcing the locking pin to move in a second direction.

Preferably, the second locking mechanism comprises guide pins for guiding the wedge member in the first direction.

Preferably, the wedge member comprises first and second sides, and a base extending between the first and second sides, wherein the first and second sides of the wedge member each engage different portions of the locking pin.

Preferably, the anti-theft device includes a handle, connected to the inner shaft, and the button lock is integrated into the handle.

Preferably, the wedge member and the button of the button lock are separately biased in the same direction.

BRIEF DESCRIPTION OF THE DRAWINGS

To assist in understanding the invention and to enable a person skilled in the art to put the invention into practical effect, preferred embodiments of the invention are described below by way of example only with reference to the accompanying drawings, in which.

Figure 1:
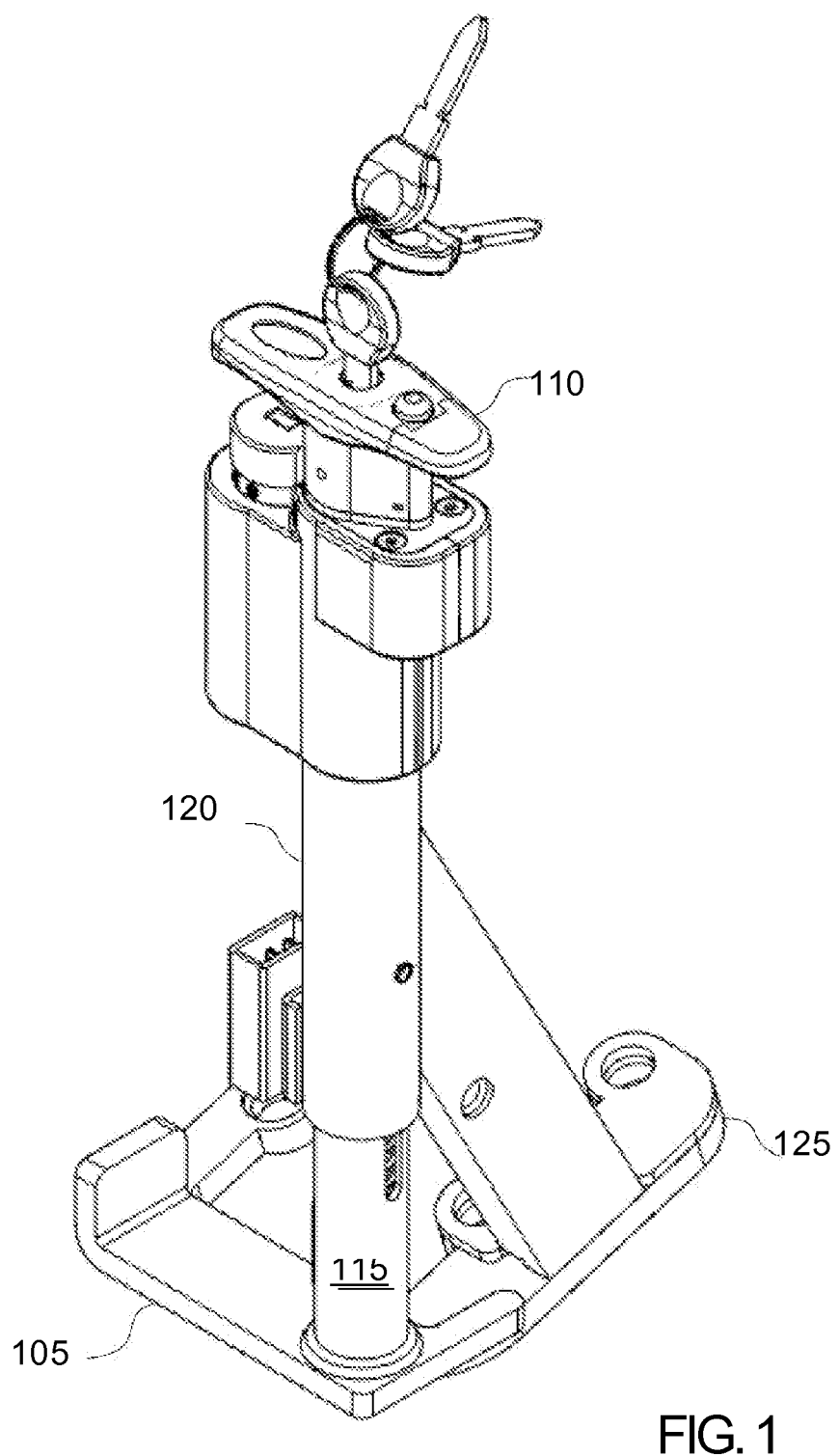
FIG. 1 illustrates a front perspective view of an anti-theft device, according to an embodiment of the present invention.

Those skilled in the art will appreciate that minor deviations from the layout of components as illustrated in the drawings will not detract from the proper functioning of the disclosed embodiments of the present invention.

DETAILED DESCRIPTION OF THE INVENTION

Embodiments of the present invention comprise anti-theft devices. Elements of the invention are illustrated in concise outline form in the drawings, showing only those specific details that are necessary to the understanding of the embodiments of the present invention, but so as not to clutter the disclosure with excessive detail that will be obvious to those of ordinary skill in the art in light of the present description.

In this patent specification, adjectives such as first and second, left and right, front and back, top and bottom, etc., are used solely to define one element or method step from another element or method step without necessarily requiring a specific relative position or sequence that is described by the adjectives. Words such as "comprises" or "includes" are not used to define an exclusive set of elements or method steps. Rather, such words merely define a minimum set of elements or method steps included in a particular embodiment of the present invention.

The reference to any prior art in this specification is not, and should not be taken as, an acknowledgement or any form of suggestion that the prior art forms part of the common general knowledge.

According to one aspect, the invention resides in an anti-theft device for a motor vehicle, the anti-theft device including: a pedal engaging member, movable between a first position and a second position, the first position for engaging a pedal of the motor vehicle and the second position for enabling the pedal to move freely; a first locking mechanism operatively connected to the pedal engaging member, for locking the pedal engaging member at the first position; and a second locking mechanism operatively connected to the pedal engaging member, for locking the pedal engaging member at the second position.

Advantages of the present invention include an improved anti-theft device that is safe to use in both standard conditions and during an accident. By having separate locks for locking the anti-theft device into different positions, anti-theft devices according to certain embodiments of the present invention are very secure, safe and easy to use.

FIG. 1 illustrates a front perspective view of an anti-theft device 100, according to an embodiment of the present invention.

The anti-theft device 100 includes a pedal engaging member 105, a handle 110 and an internal shaft 115 connecting the pedal engaging member 105 to the handle 110. An external shaft 120 encases the internal shaft 115, and the external shaft 120 is attached to a pedestal 125. The pedestal 125 is for attaching to a firewall or other suitable part of a motor vehicle.

As will be readily understood by the skilled addressee, anti-theft device according to alternative embodiments of the present invention may be attached to a motor vehicle by any suitable means. Suitable means includes, for example, a clamp (130) for mounting to the steering column of the motor vehicle, or a bracket for mounting to a chassis portion of the motor vehicle.

The internal shaft 115 is slidable inside the external shaft 120 to move the pedal engaging member 105 backwards and forwards relative to the external shaft 120. As the external shaft 120 is anchored to the vehicle using the pedestal 125, longitudinal movement of the internal shaft 115 can be used to engage and disengage a pedal of the motor vehicle.

As will be understood by a person skilled in the art, the pedal engaging member 105 can be used to prevent movement of a brake pedal, a clutch pedal or an accelerator pedal, either from an engaged position or a disengaged position.

Figure 2:
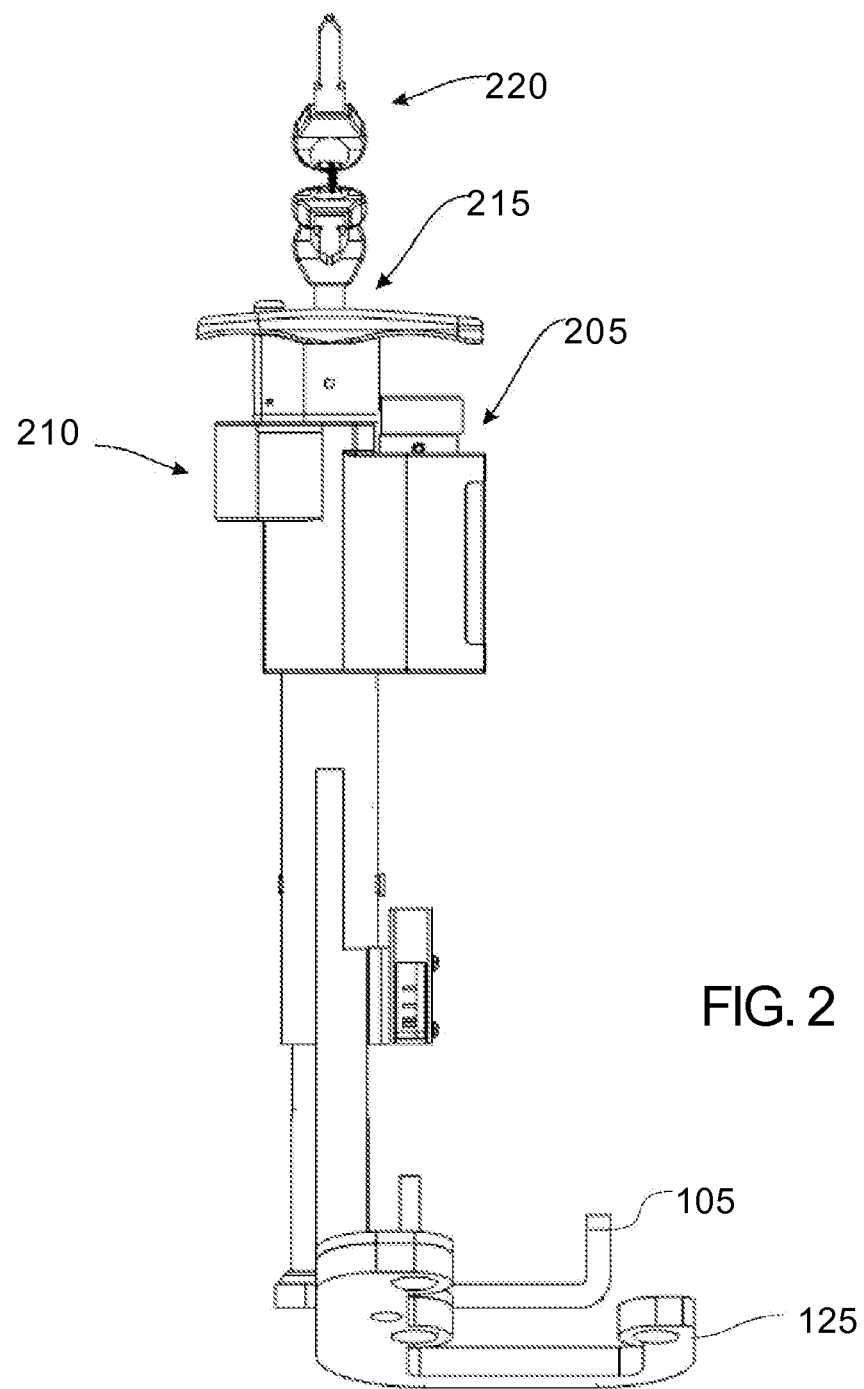
FIG. 2 illustrates a rear view of the anti-theft device of FIG. 1, according to an embodiment of the present invention.
Figure 3:
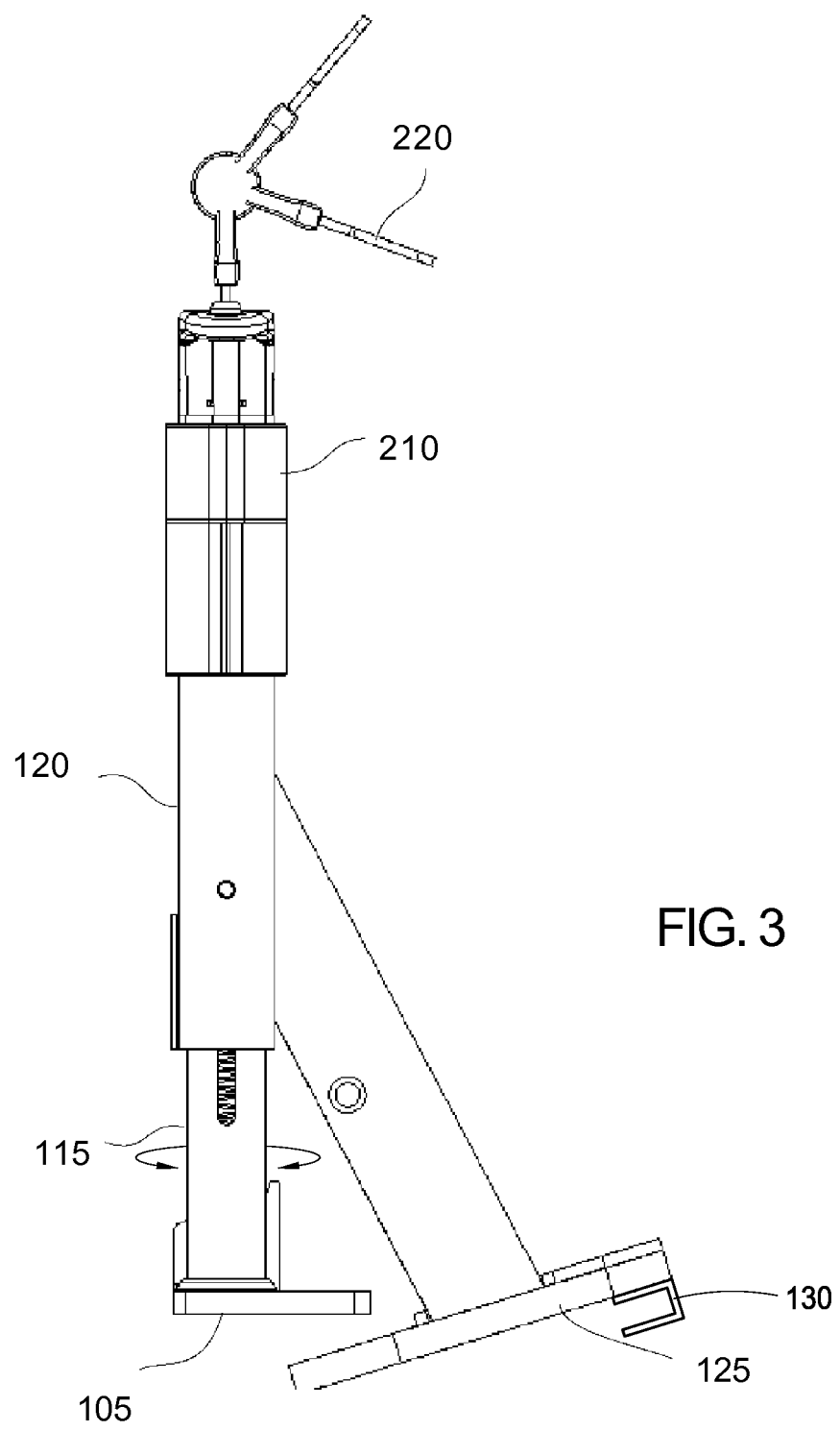
FIG. 3 illustrates a side view of the anti-theft device of FIG. 1, according to an embodiment of the present invention.

FIG. 2 illustrates a rear view and FIG. 3 illustrates a side view of the anti-theft device 100, according to an embodiment of the present invention.

The anti-theft device 100 further includes a first lock 205, for locking the anti-theft device 100 in an engaged position, and a second lock 210, for locking the anti-theft device 100 in a disengaged position.

The first lock 205 prevents a thief from disengaging the anti-theft device 100 and thus being able to operate the pedals of the motor vehicle. The first lock 205 is locked and/or unlocked by a key, as will be understood by a person skilled in the art.

The second lock 210 prevents the anti-theft device 100 from engaging unwillingly. The second lock 210 is locked and/or unlocked by a button, but as will be understood by the skilled addressee, any suitable locking mechanism may be used.

The anti-theft device 100 further includes a third lock 215, for locking the anti-theft device 100 in an engaged position. The first lock 205 and the third lock 215 essentially perform the same function, but together provide increased security over use of a single lock 205, 215.

The first and third locks 205, 215 are locked by a key 220. As will be understood by the skilled addressee, other means for locking the first and third locks 205, 215 can be used. Similarly, the first and third locks 205, 215 can both use the same key 220 or each use different keys 220.

Figure 4:
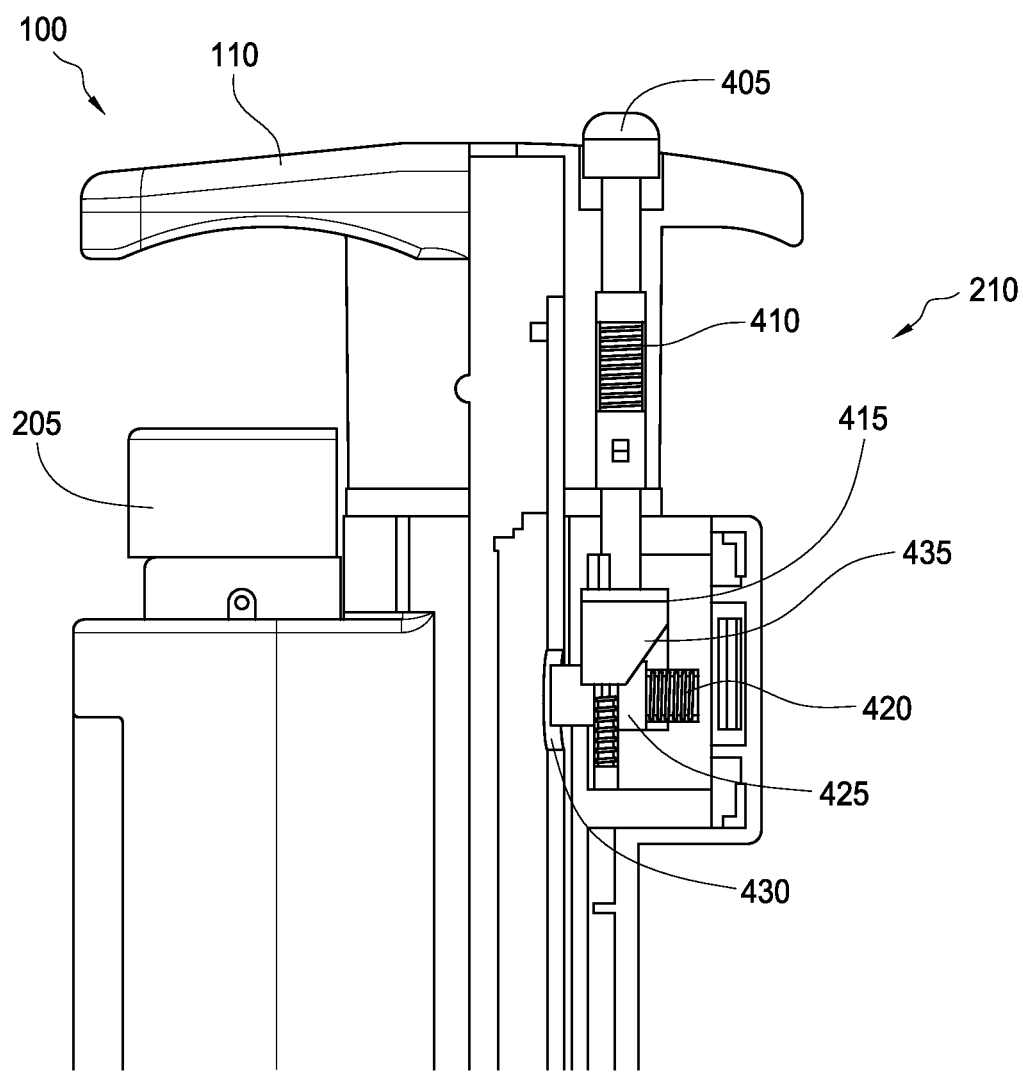
FIG. 4 illustrates an enlarged view of a lock of the anti-theft device of FIG. 1, in a locked position, according to an embodiment of the present invention.

FIG. 4 illustrates an enlarged view of the second lock 210 of the anti-theft device 100, in a locked position, according to an embodiment of the present invention.

Figure 5:
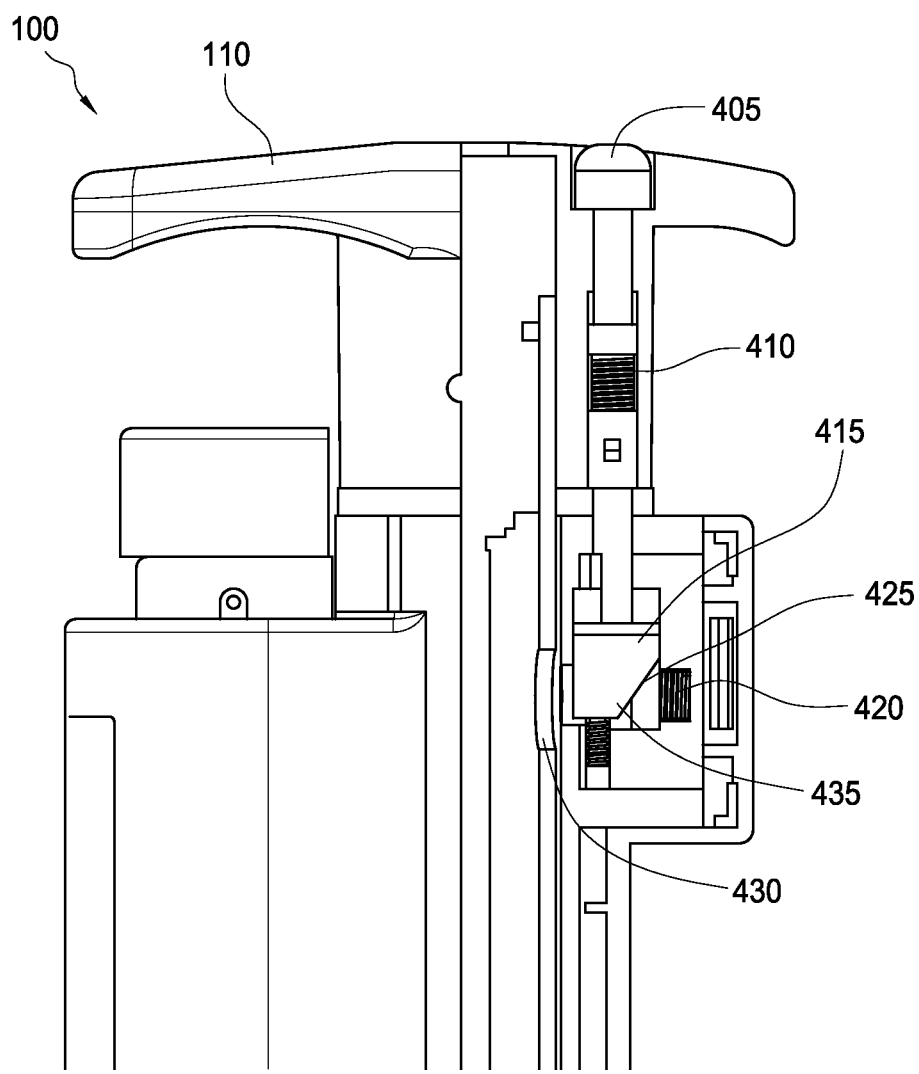
FIG. 5 illustrates an enlarged view of the lock of FIG. 4, in an unlocked position, according to an embodiment of the present invention.

The second lock 210 includes a switch button 405, a spring engaged pin 410, a wedge plate 415, a biasing spring 420, a locking pin 425 and a channel 430 formed in the internal shaft 115. The switch button 405 engages the wedge plate 415 vertically through the spring engaged pin 410. As an engaging surface 435 of the wedge plate 415 moves down over a diagonal surface of the locking pin 425, the locking pin 425 is moved horizontally against the biasing spring 420. This in turn results in the locking pin 425 being completely disengaged from the channel 430, as illustrated in FIG. 5, thus enabling the internal shaft 115 to move freely inside the external shaft 120.

Figure 6:
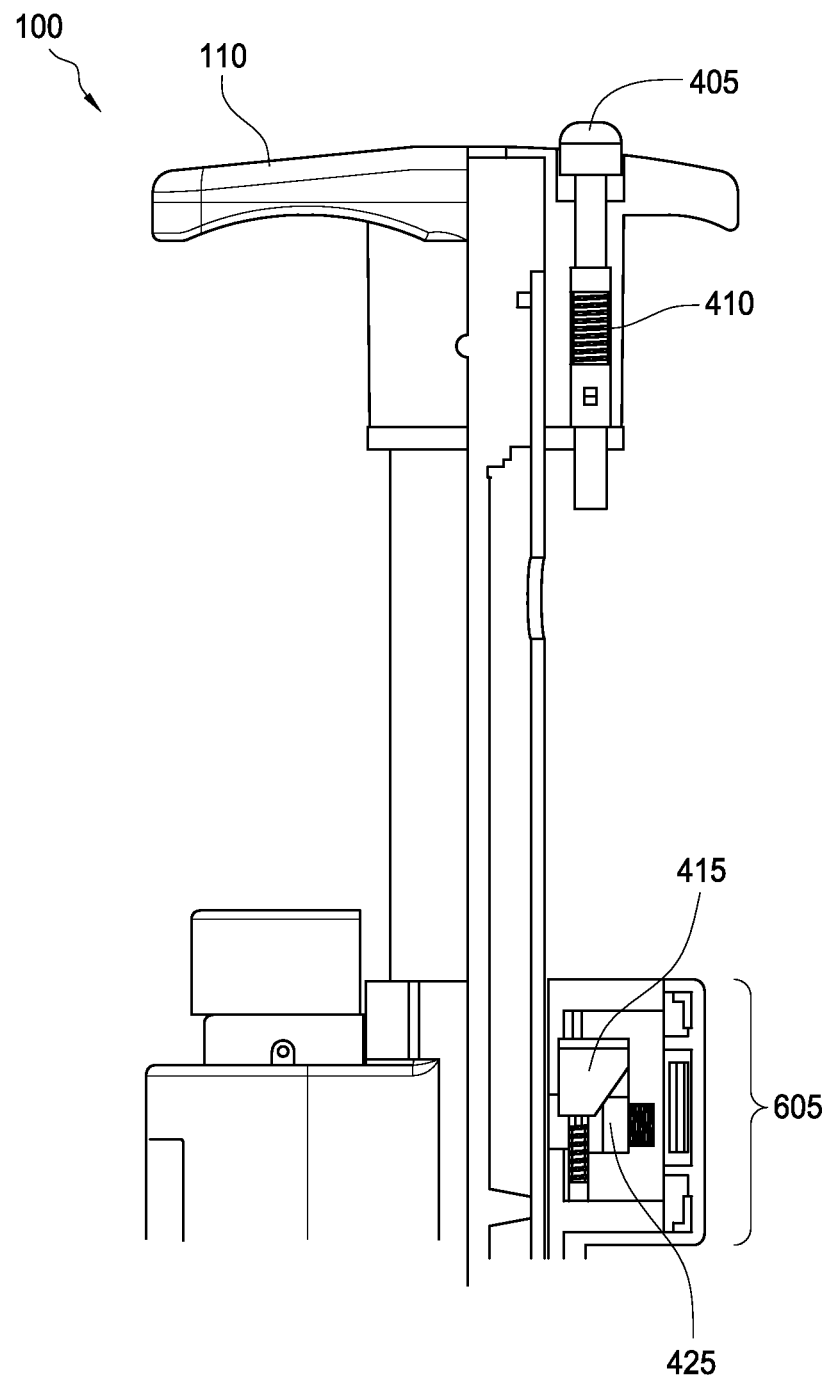
FIG. 6 illustrates an enlarged view of the lock of FIG. 4, in an open position, according to an embodiment of the present invention.

The handle 110 may then be pulled outwards from the external shaft 120, as illustrated in FIG. 6. The switch button 405 and the spring engaged pin 410 form part of the handle 110, and the wedge plate 415, the locking pin 425 and the biasing spring 420 form part of a base 605 that remains attached to the external shaft 120.

As the handle 110 is pulled outwards, the pedal engaging member 105 is moved in the same direction and thus becomes positioned behind a pedal of the motor vehicle. The pedal can then no longer be engaged, making it very difficult to operate the motor vehicle, even if the engine has been started.

Figure 7:
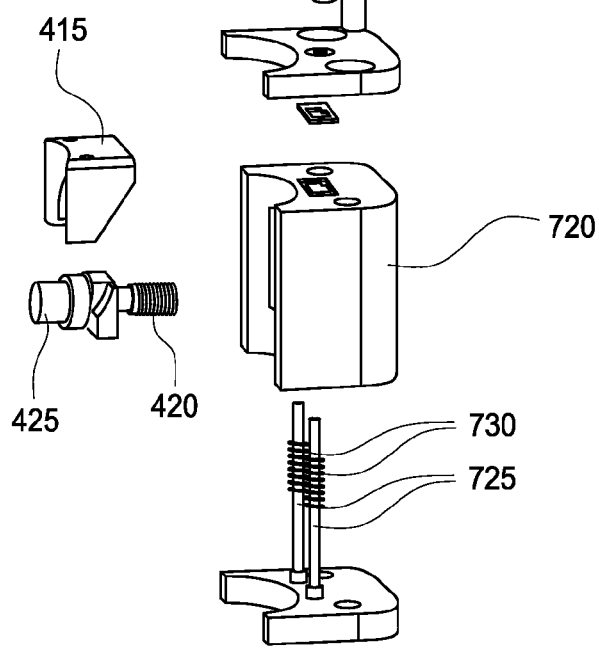
FIG. 7 illustrates an exploded view of the lock of FIG. 4, according to an embodiment of the present invention.

FIG. 7 illustrates an exploded view of the second lock 210, according to an embodiment of the present invention.

The handle 110 includes a button housing 705, for housing the switch button 405, and a pin housing 710, for housing the spring engaged pin 410.

The second lock 210 further includes a collar 715, for receiving the spring engaged pin 410. The collar 715 allows part of the spring engaged pin 410 to extend through the collar 715, but engages a spring part of the spring engaged pin 410. This enables the button 405 to be automatically releasing, which in turn makes the locking pin 425 automatically engaging.

As will be understood by the skilled addressee, the collar 715 can form part of the handle 110.

The switch button 405 can be attached to the spring engaged pin 410 by a threaded screw-type connection, or any other suitable means.

The second lock 210 further comprises a housing 720, for receiving the wedge plate 415, the locking pin 425 and the biasing spring 420. The housing 720 is permanently attached to the external shaft 120, and functionally forms part of the external shaft 120.

The second lock 210 further includes guide pins 725 for guiding movement of the wedge plate 415 in the vertical direction. The guide pins 725 include springs 730 for biasing the wedge plate 415 vertically, i.e. away from the locking pin 425.

Figure 8:
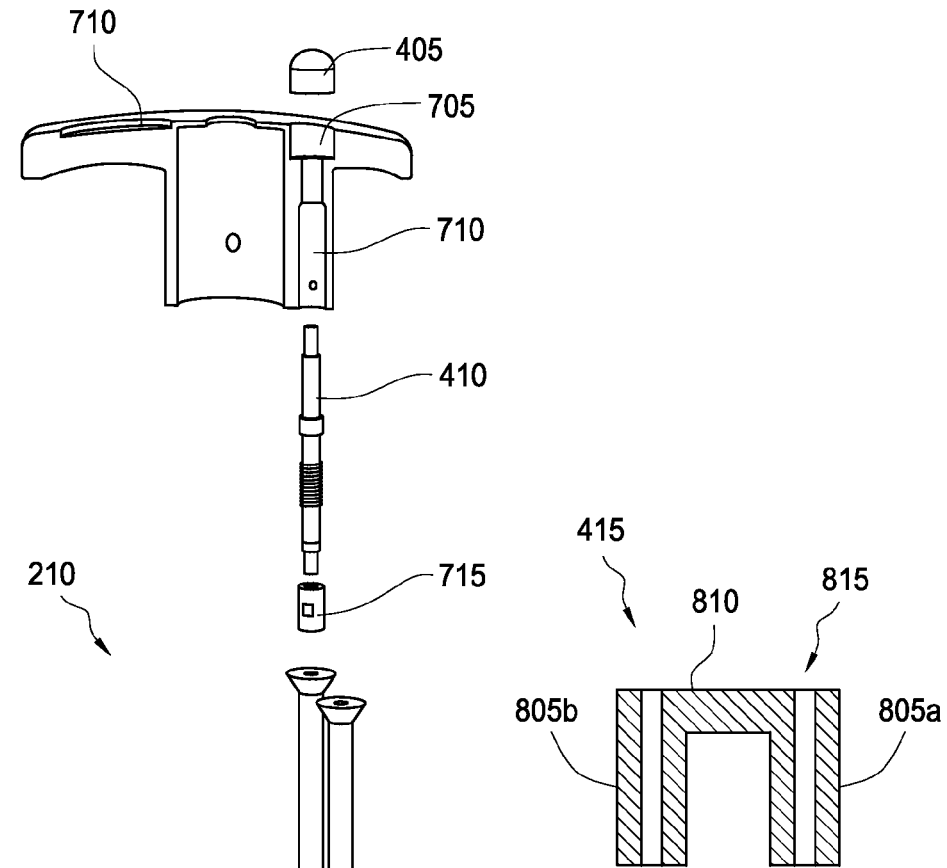
FIG. 8 illustrates a side cross-sectional view of a wedge plate of the lock of FIG. 4, according to an embodiment of the present invention.

FIG. 8 illustrates a side cross sectional view of the wedge plate 415, according to an embodiment of the present invention.

The wedge plate 415 comprises first side 805a and a second side 805b, and a base 810 extending between the first and second sides. The first and second sides 805a, 805b each engage different portions of the locking pin 425, which can, for example, comprise grooves or flanges of the locking pin 425.

Additionally, as best illustrated in FIG. 8, the wedge plate 415 includes vertical channels 815, for receiving the guide pins 725.

In use, the second lock 210 prevents the handle 110 and the inner shaft 115 from moving uncontrollably towards a driver of the motor vehicle in case of an accident or sudden movement. Similarly, the second lock 210 prevents the pedal engaging member 105 from accidently engaging a pedal while the motor vehicle is underway.

As will be understood by the skilled addressee, the longitudinal movement of the handle 110 as described above is an example of means by which the anti-theft device 100 can be engaged. Other examples include rotational movement, wherein the pedal engaging member is engaged by rotation of the inner shaft 115.

In summary, advantages of the present invention include an improved anti-theft device that is safe to use in both standard conditions and during an accident. By having separate locks for locking the anti-theft device into different positions, anti-theft devices according to certain embodiments of the present invention are very secure, safe and easy to use.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. Accordingly, this patent specification is intended to embrace all alternatives, modifications and variations of the present invention that have been discussed herein, and other embodiments that fall within the spirit and scope of the above described invention.

The invention claimed is:

1. An anti-theft device for a motor vehicle, the anti-theft device comprising:
   a pedal engaging member, movable between a first position and a second position, the first position configured to engage a pedal of the motor vehicle and the second position configured to enable the pedal to move freely;
   a first locking mechanism operatively connected to the pedal engaging member, configured to lock the pedal engaging member at the first position, wherein the first locking mechanism is configured to be locked and/or unlocked by a key; and
   a second locking mechanism that operates independently from the first locking mechanism, wherein the second locking mechanism is operatively connected to the pedal engaging member, and configured to lock the pedal engaging member at the second position;
   wherein the second locking mechanism comprises a locking pin configured to engage with an opening in an inner shaft and to prevent movement of the inner shaft relative to an outer shaft, wherein the second locking mechanism comprises a button lock, and wherein pressing a button of the button lock releases the second locking mechanism.

2. The anti-theft device of claim 1, further comprising a mounting member operatively connected to the pedal engaging member, configured to attach the anti-theft device to the motor vehicle.

3. The anti-theft device of claim 2, wherein the mounting member comprises a pedestal configured to attach to a firewall of the motor vehicle.

4. The anti-theft device of claim 1, wherein the inner shaft is connected to the pedal engaging member and the outer shaft is attached to a mounting member.

5. The anti-theft device of claim 1, wherein the pedal engaging member is movable between the first and second positions by sliding the inner shaft within the outer shaft.

6. The anti-theft device of claim 1, wherein the pedal engaging member is movable between the first and second positions by rotating the inner shaft within the outer shaft.

7. The anti-theft device of claim 1, wherein the second locking mechanism is configured to automatically lock the pedal engaging member at the second position when the pedal engaging member is in the second position.

8. The anti-theft device of claim 1, wherein the second locking mechanism comprises a wedge member movable in a first direction, the wedge member comprising a sloped surface relative to the first direction configured to engage with the locking pin and to force the locking pin to move in a second direction.

9. The anti-theft device of claim 8, wherein the second locking mechanism comprises guide pins configured to guide the wedge member in the first direction.

10. The anti-theft device of claim 8, wherein the wedge member comprises first and second sides, and a base extending between the first and second sides, and wherein the first and second sides of the wedge member are each configured to engage different portions of the locking pin.

11. The anti-theft device of claim 1, wherein the anti-theft device comprises a handle connected to the inner shaft, and the button lock is integrated into the handle.

12. The anti-theft device of claim 8, wherein the wedge member and the button of the button lock are biased in the same direction relative to each other.

13. The anti-theft device of claim 2, wherein the mounting member comprises a steering column clamp configured to attach to a steering column of the motor vehicle.

* * * * *